United States Patent [19]

Lenz

[11] 4,365,178

[45] Dec. 21, 1982

[54] LAMINATED ROTOR FOR A DYNAMOELECTRIC MACHINE WITH COOLANT PASSAGEWAYS THEREIN

[75] Inventor: Henry G. Lenz, Scotia, N.Y.

[73] Assignee: General Electric Co., Schenectady, N.Y.

[21] Appl. No.: 271,443

[22] Filed: Jun. 8, 1981

[51] Int. Cl.³ .............................................. H02K 9/00
[52] U.S. Cl. ...................................... 310/61; 310/59; 310/65; 310/216
[58] Field of Search ........................... 310/52, 55–65, 310/216, 217, 261, 264, 265

[56] References Cited

U.S. PATENT DOCUMENTS

| | | | |
|---|---|---|---|
| 890,577 | 6/1908 | Richards | 310/61 |
| 996,927 | 7/1911 | Ihlder | 310/65 |
| 2,368,295 | 1/1945 | Goran | 164/112 |
| 2,368,296 | 1/1945 | Goran | 164/112 |
| 2,504,824 | 4/1950 | George | 164/333 |
| 2,607,968 | 8/1952 | Peterson | 164/200 |
| 3,684,906 | 8/1972 | Lenz | 310/61 |
| 4,301,386 | 11/1981 | Schweder et al. | 310/59 |

Primary Examiner—R. Skudy
Attorney, Agent, or Firm—Vale P. Myles

[57] ABSTRACT

A laminated rotor for a dynamoelectric machine characterized by requiring and incorporating only two differently configured sets of rotor laminations to afford axial and radial coolant passageways through the rotor. Each lamination in the respective sets is provided with punched apertures that form, respectively, conductor slots arcuately spaced around its periphery, and is further provided with a plurality of axial coolant passageways near its inner diameter. Each lamination in one of the sets of laminations also includes a plurality of arcuately spaced radial ducts, each disposed between a respective pair of conductor slots. The axial coolant passageways in one set of laminations are arranged to overlap a predetermined portion of the inner ends of the radial ducts in the other set of laminations to enable cooling air to be forced through the axial coolant passageways into the radial ducts and then into the air gap of the machine when the sets of laminations are stacked to form a rotor that is then mounted in operating position, relative to an associated stator.

4 Claims, 5 Drawing Figures

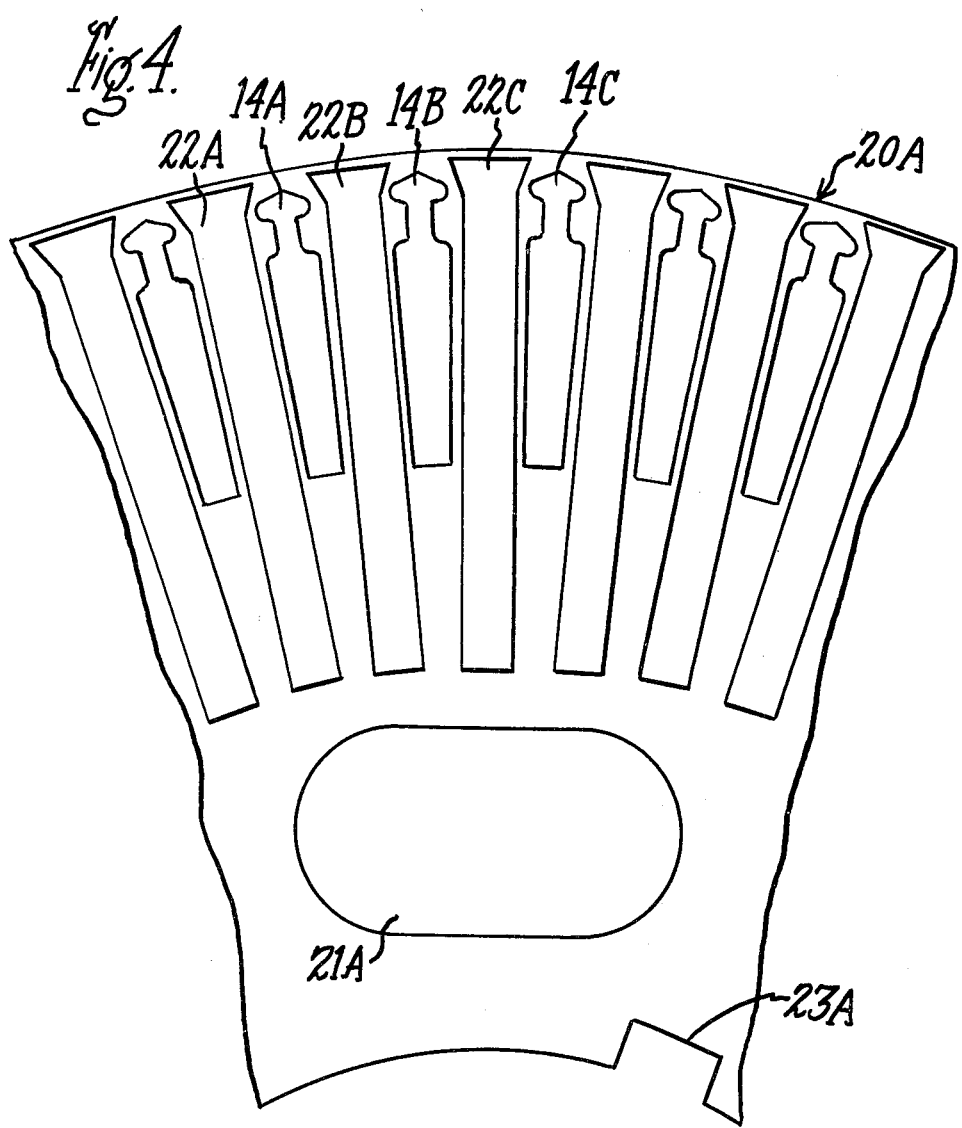

LAMINATED ROTOR FOR A DYNAMOELECTRIC MACHINE WITH COOLANT PASSAGEWAYS THEREIN

BACKGROUND OF THE INVENTION

The invention relates to a laminated rotor assembly that is particularly useful in the manufacture of dynamoelectric machines employing cast conductors and, more particularly, it relates to such an assembly that requires only two differently configured sets of rotor laminations to form a rotor having radial cooling ducts that are connected to axial coolant passageways in a manner that enables rotor conductors to be efficiently cooled. The invention also makes it possible to cast the conductors of a rotor assembly without requiring the use of spacer pins, or spot welded collar subassemblies, separately inserted into the laminae assembly of the rotor during a casting operation to prevent the flow of casting metal from the conductor slots into cooling ducts of the assembly.

Before the present invention, the use of axial and radial cooling passageways through the rotors of electric motors and generators was well known. It was common practice in the manufacture of large-diameter dynamoelectric machines to cast conductors in their laminated rotor assemblies by utilizing various types of spacers to prevent the molten casting metal from entering the rotor air ducts during a casting operation. For example, U.S. Pat. No. 2,368,296 discloses a method of forming radial ventilating passages in a cast rotor in which ring-shaped spacers are inserted between groups of laminations during the casting operation. The same inventor named in the foregoing patent discloses in U.S. Pat. No. 2,368,295 the use of cardboard or similar combustible material to form spacers in a rotor made of stacked laminations so that during a casting operation the combustible material blocks the casting metal from the coolant passageways. Similarly, in U.S. Pat. No. 2,607,968 there is described a method for casting dynamoelectric machine rotors so that air ducts are formed by spacers made of frangible plaster material that is positioned between the groups of the laminations in the rotor during a casting operation. Following the casting procedure, the plaster material is disintegrated and washed from the air ducts.

Although the use of such dissolvable or frangible spacer materials is well-known, it is also a common practice in the manufacture of relatively large dynamoelectric machine rotors to place a plurality of removable steel pins, or spot welded collar subassemblies, between sections of the rotor laminations to form the desired cooling ducts in the rotors. The use of such a reusable spacer procedure is shown, for example, in U.S. Pat. No. 2,504,824.

Well before the development and commercialization of such removable ring or pin techniques for casting conductors in laminated rotors, it was known to fabricate laminated rotors of a series of differently configured punched laminations arranged to form axial coolant passageways connected to radial coolant ducts by venting channels. An example of several early configurations of that type of ventilating arrangement in a wound rotor structure is shown in U.S. Pat. No. 890,577 which issued on June 9, 1908. However, since such early rotor cooling arrangements were not suitable for use in manufacturing cast conductor rotors, due to the fact that they would allow molten conductor metal to enter the coolant passageways therein, it remained common practice to manufacture rotors having cast conductors by the aforementioned movable spacer-pin methods.

In more recent times, as shown in U.S. Pat. No. 3,684,906, which issued on Aug. 15, 1972 to the applicant named herein, a relatively small castable rotor for refrigerant compressor motors was disclosed in which a plurality of sets of differently configured rotor laminae were arranged to form tortuous paths through the rotor from accurately spaced axial refrigerant-carrying passageways, through intermediate vent passageways, to arcuately disposed radial ducts. Such small refrigerant compressor motors are distinguished from the present invention by requiring the use of radial coolant ducts in two different sets of laminations so that the radial ducts in either such set do not extend the full depth of the adjacent conductor slots. Furthermore, the flow-restricting nature of the small, tortuous ducts used to carry refrigerant through such rotors are not suitable for use as coolant passageways for larger air-cooled rotors in which large volumes of air must be moved through the rotor ducts with little pressure loss.

Finally, in two co-pending U.S. patent applications; Ser. No. 824,104, filed Aug. 12, 1977, now U.S. Pat. No. 4,301,386 and Ser. No. 95,024, filed Nov. 16, 1979, now U.S. Pat. No. 4,286,182 both of which are assigned to General Electric Co., the present applicant has disclosed laminated rotor assemblies for rotors of dynamoelectric machines which assemblies use three or more differently configured sets of rotor laminations to provide coolant vent passageways axially and radially through rotors that can be formed with cast conductors, without requiring use of casting pins, removable plugs, or other prior art means, such as those discussed above, to block molten casting metal from the coolant passageways. The present invention is an improvement over the invention disclosed in those two co-pending applications because it avoids the expense and manufacturing complexity inherent in using more than two differently configured sets of rotor laminations, when the diameter of a rotor is sufficiently large to enable effective use of this improvement invention.

OBJECTS OF THE INVENTION

Accordingly, it is a primary object of the present invention to provide a laminated rotor for a dynamoelectric machine having cast rotor conductors and having simplified passageways arrangements for connecting spaced radial cooling ducts to axial coolant passageways, in a large-diameter rotor assembly that is more readily and economically manufactured than those heretofore known.

Another object of the invention is to provide a laminated rotor assembly having cast conductors in combination with radial cooling ducts that are formed to extend past the entire radial depth of adjacent conductor slots and into overlapping relationship with axial coolant passageways in the assembly.

Yet another object of the invention is to provide a laminated rotor assembly for a dynamoelectric machine having only two sets of differently configured rotor laminations, arranged in recurring patterns, to provide arcuately and axially spaced coolant ducts extending from the periphery of the rotor past the entire depth of the conductor slots into overlapping relationship with venting apertures in adjacent laminae, which in turn are in communication with axial coolant passageways formed through the main rotor laminations.

Additional objects and advantages of the invention will be apparent from the description of it presented below considered in conjunction with the accompanying drawings.

SUMMARY OF THE INVENTION

In one preferred embodiment a laminated rotor having cast conductors is provided with a plurality of spaced radial cooling ducts that extend from the periphery of the rotor to points well below the bottoms of adjacent conductor slots. The radial ducts are formed by punching a first set of rotor laminae in a predetermined pattern that includes a radial coolant duct slots, as well as conductor slots and apertures that form part of the axial cooling air passageways through the lamination when it is stacked with similar laminations to form a rotor assembly. A second, differently configured set of laminae are used as main rotor laminae and are punched to form arcuately spaced conductor slots in the periphery thereof, along with a plurality of arcuately spaced axial coolant apertures between the center of the laminae and the inner ends of the conductor slots. The axial coolant apertures are arranged to be positioned in overlapping relationship with a portion of the axial coolant passageways in adjacent laminations of the first set of laminae when stacked to form a rotor assembly. When so stacked, both sets of the laminae are arranged with their respective conductor slots and axial coolant passageways, in alignment, and compressed together in fluid type relationship so that molten metal cannot flow between adjacent lamina from the conductor slots into adjacent cooling ducts. Electrical conducts are then cast in each of the conductor slots and a pair of integrally cast annuli are formed around the outer portions of the two end-most laminae to interconnect all of the conductor bars in a well-known manner.

After the conductor bars and end annuli have been formed on a rotor assembly, the outer peripheral surface of the cooling duct laminae are machined away to open the outer ends of the radial cooling ducts. Thus, cooling air can be forced through the axial cooling passageways in the main rotor laminations into the overlapping areas of the radial cooling ducts and then through the radial ducts and out of the rotor into an adjacent gap, between it and an associated stator, when the rotor is supported on a suitable shaft and mounted for rotation within such a stator in a manner well-known in the art.

BRIEF DESCRIPTION OF THE DRAWINGS

FIG. 1A is an enlarged, fragmentary, side elevation of part of the machine shown in FIG. 1 illustrating the details of one of the groups of laminations, comprising a set of main rotor laminations of a first configuration, and a set of radial duct laminations of a different configuration, to form the axial cooling passageways and radial ducts for the rotor according to the invention.

FIG. 4 is a top plan view of a fragment of a radial cooling duct lamination that can be used instead of the lamination of FIG. 2 in making a rotor assembly similar to that illustrated in FIG. 1.

DESCRIPTION OF THE PREFERRED EMBODIMENT

Figure 1:
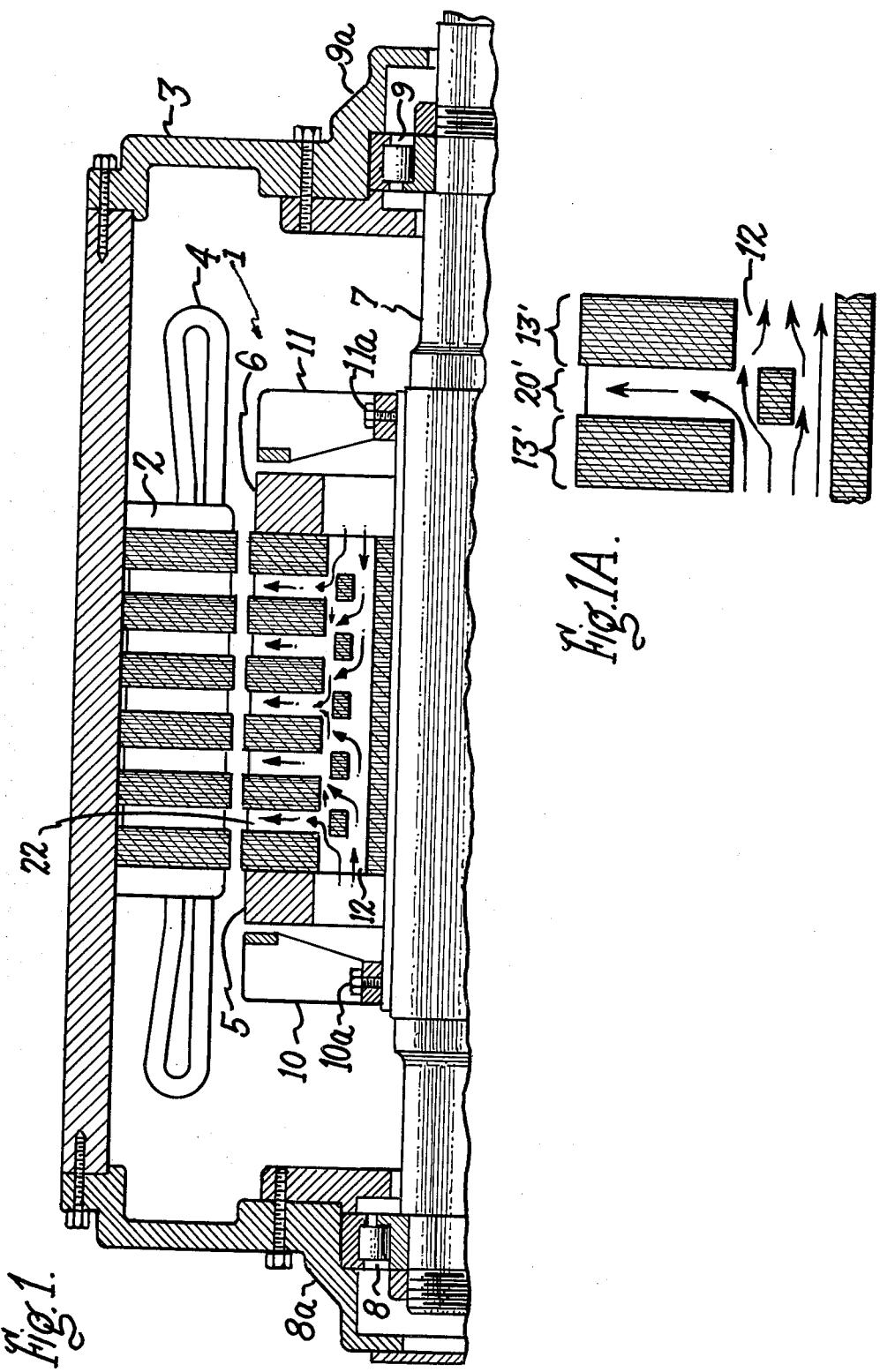
FIG. 1 is a side elevation, partly in cross-section, illustrating the upper half of a dynamoelectric machine having cast conductors and a laminated rotor constructed of a plurality of groups of laminations, all made up of only two sets of differently configured laminations to form axial and radial coolant passageways through it, according to the present invention.

Referring to FIG. 1, it will be seen there is depicted a laminated rotor assembly 1 constructed according to the invention. The rotor is mounted in an otherwise generally conventional dynamoelectric machine for rotation relative to a stator 2 and housing 3 thereof. The present invention is useful in either large diameter rotors that afford ample space between the shaft and the radial cooling ducts to accommodate relatively deep axial coolant passageways in the main rotor laminations, as required by the invention; or in rotors having for or more poles that distribute magnetic flux so that magnetic saturation of the laminae near the shaft will not occur. Accordingly, the stator 2 shown here as a preferred embodiment, is wound with a conventional winding 4 to define at least four electrical poles on the stator.

The rotor 1 is also provided with a plurality of cast conductors arranged in arcuately spaced axial conductor slots adjacent to its peripheral surface in a manner that will be more fully described below. These axial conductors of the rotor 1 are interconnected at their opposite ends by a pair of cast annuli 5 and 6, seen in cross-section in FIG. 1. A suitable steel shaft 7 is interference fitted or otherwise mounted in fixed relationship with the stacked lamination assembly of rotor 1 and is mounted for rotation on a pair of rolling elements (or sliding elements), such as bearing assemblies 8 and 9, which in turn are mounted in a conventional manner in suitable hubs 8a and 9a on the housing 3. Also mounted on the shaft 7 are a pair of fans 10 and 11 that force air over the ends of windings 4. Cooling air also passes through the fans and into the opposite ends of a plurality of axial coolant passageways in the rotor 1. One of the axial passageways is designated by the numeral 12 in FIG. 1, as shown by the arrows in FIG. 1. These fans may be mounted in any conventional manner such as by the mounting bolts 10a and 11a shown in FIG. 1 or by being pressed onto the shaft. In alternative forms of such machines fans are cast integrally with the rotor end rings or annuli 5 and 6 to project axially outward therefrom. In such an alternative fan arrangement, as well as in the arrangement shown in FIG. 1, the cooling air pressure head which draws the air into the axial passageways (12, etc.) is produced by centrifugal force in the radial ducts of the rotor, which are directly connected to the axial passageways.

Figure 2:
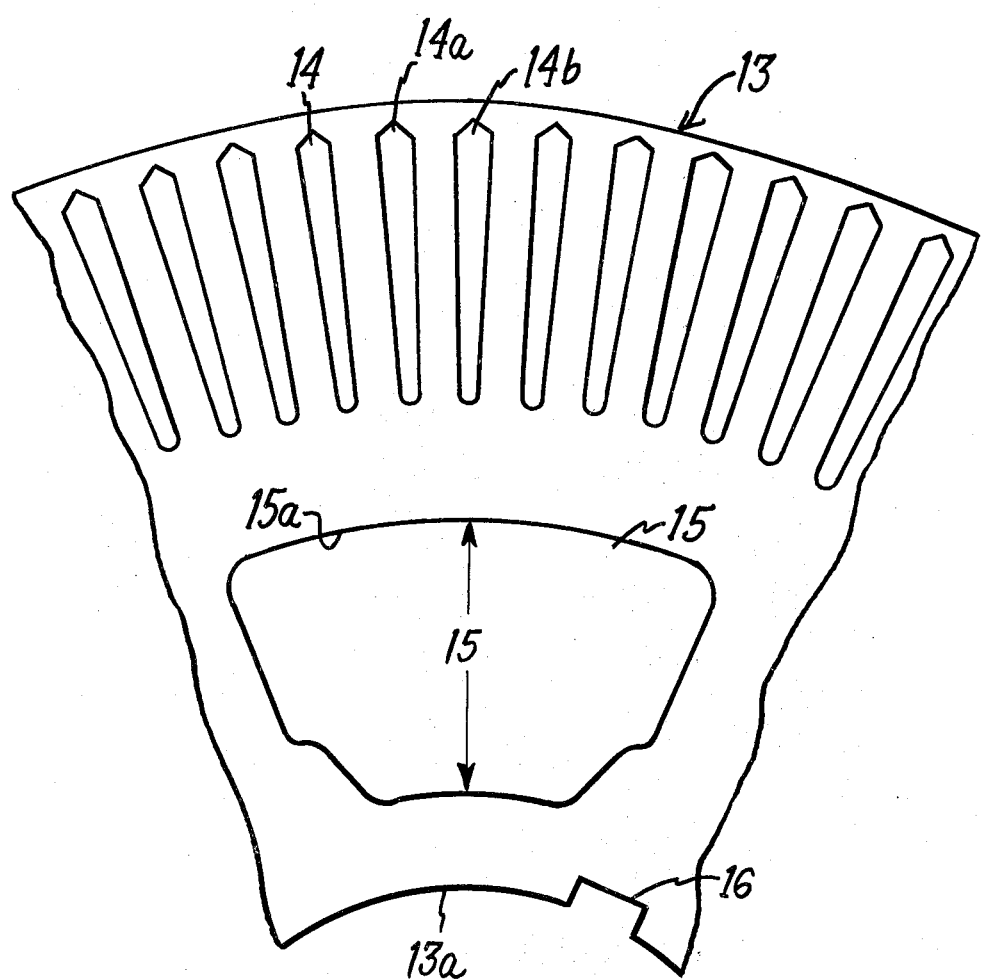
FIG. 2 is a top plan view of a fragment of a main rotor lamination for the laminated rotor shown in FIG. 1.

Before describing the unique features of the laminated rotor assembly 1 in greater detail with reference to FIG. 1, a description will be given of the distinguishing features of the two differently configured sets of laminations used in the assembly, as they are illustrated, respectively, in FIGS. 2 and 3. Considering first a main rotor lamination 13, as shown in FIG. 2, it will be seen that this lamina is formed with apertures that respectively define a plurality of conductor slots 14, 14a, 14b, etc. that are arcuately spaced adjacent the periphery of the lamina. Other apertures in the lamina 13 form a plurality of coolant conducting passages, one of which is designated by the number 15. These apertures are arcuately spaced around the inner portion of lamina 13 between the inner ends of the conductor slots 14, 14a, etc. and the inner diameter 13a of the annular lamina 13.

It will be understood that in constructing a rotor, such as the rotor lamination assembly 1 shown in FIG. 1, there will be a plurality of substantially flat, annular main rotor laminations, substantially identical to the lamina 13 shown in FIG. 2, arranged in the novel manner of the invention, which will be more fully described below. In addition to the conductor slot apertures and the axial coolant conducting apertures formed in the main rotor laminations, each of these laminae, such as the lamina 13, is provided with a slot 16 that is punched in its inner diameter edge 13a to provide a means for quickly aligning respective sets of the laminae when they are stacked in sets, preparatory to having conductors cast in the conductor slots 14–14b, etc.

Figure 3:
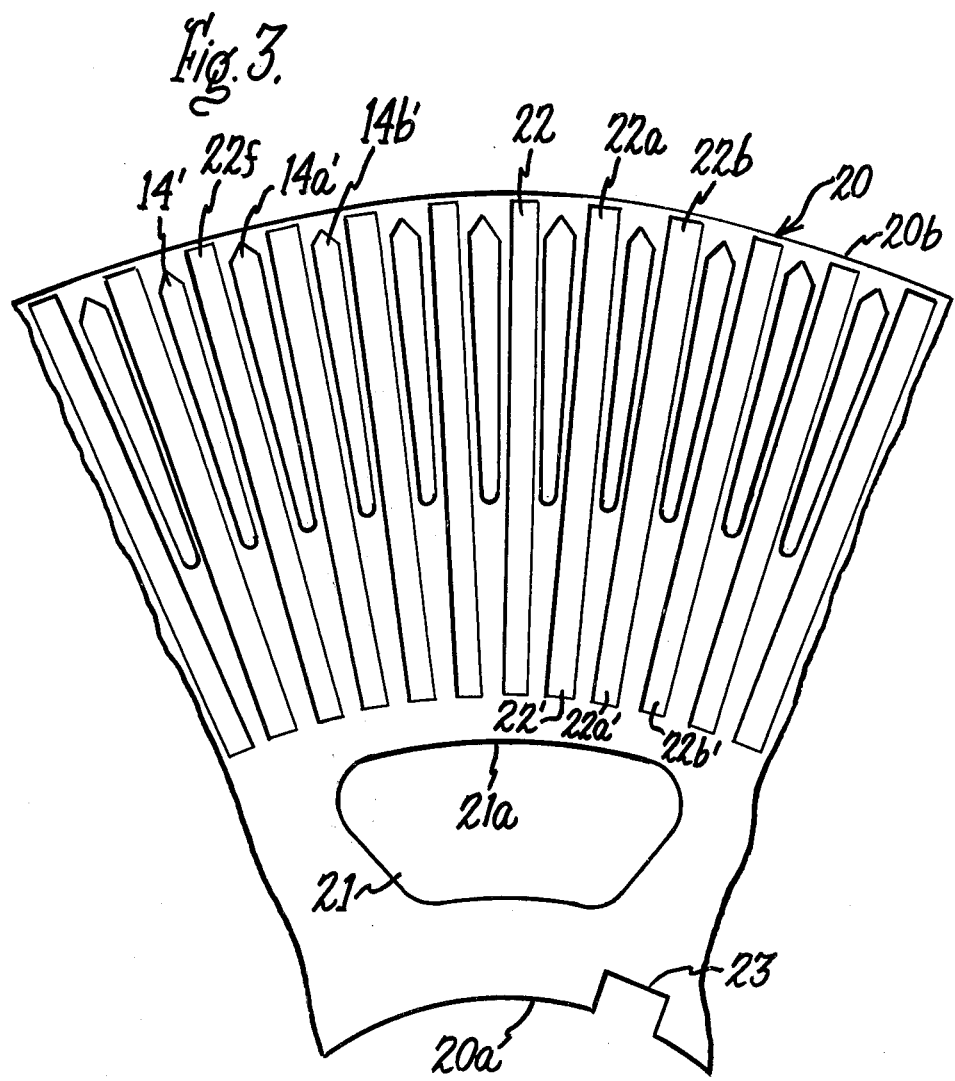
FIG. 3 is a top plan view of a fragment of a radial cooling duct lamination for the rotor shown in FIG. 1.

In FIG. 3 there is shown a fragment of a substantially flat, annular, radial cooling duct lamina. Each radial duct lamina in the rotor 1, is essentially identical in configuration to the lamina 20, and is punched to form apertures therein that define, respectively, a plurality of conductor slots 14', 14a', 14b', etc. which are substantially identical in shape to the conductor slots formed respectively in the main rotor laminae 13 described above with reference to FIG. 2. Slots 14', 14a', 14b' may be different in size and/or shape from slots 14, 14a and 14b in the main rotor laminae 13, for the purpose of varying the width of coolant duct slots 22, 22a, 22b, or the width of the metal strips that separate the conductor slots (14', 14a', etc.) from the duct slots (22, 22a, etc.), or for various manufacturing purposes such as providing standardization or commonality between different electrical designs, that are determined by slot shapes and the number of slots in a rotor. The conductor slots 14', 14a', etc., are arcuately spaced adjacent the periphery of the lamina 20 so they are aligned with the slots 14, 14a, etc. in adjacent main rotor laminae 13, when stacked therewith.

In addition to the conductor slots, a plurality of axial coolant passageways such as the passageway 21, shown in FIG. 3, are arcuately spaced between the inner ends of the conductor slots 14', 14b', etc. and the inner diameter 20a of hte lamina 20. While the radial coolant duct slots 22, 22a, 22b, etc. are shown as rectangles in FIG. 4, it should be recognized that the slots can be formed in other shapes. One alternative configuration of coolant duct is shown, for example, in FIG. 4 wherein radial coolant slots 22A, 22B, 22C, etc. are provided with flared openings at their respective outer ends. The advantages of this laminae configuration are reduction in the noise produced by the radial air ducts, and improved machineability of the rotor surface when its periphery is cut away to open the coolant ducts. In addition, it will be noted that conductor slots 14A, 14B and 14C, etc. in the duct lamination of FIG. 4 differ in form from the conductor slots 14', 14a' and 14b' shown in FIG. 3, in order to further illustrate the flexibility of the invention.

Returning now to a description of the invention in the embodiment thereof using the configurations of laminae shown in FIGS. 2 and 3, it will be seen that each of the radial duct laminae, like lamina 20, is also provided with a plurality of punched, or otherwise machined, coolant duct slots 22, 22a, 22b, etc. that extend, respectively, from the periphery of the lamina to a point, such as the points 22', 22a' 22b', shown in FIG. 3, located between the inner ends of the conductor slots and the outer extent, or diameter 21a; of the adjacent coolant passageways 21.

It will also be seen by reference to FIGS. 2 and 3 that these points 22', 22a', etc. are radially positioned between the outer extent 21a (for example) of the respective coolant passageways 21, etc. and the outer extent 15a, seen in FIG. 2, of the adjacent axial coolant apertures, such as coolant apertures 15, etc. shown in the main rotor laminae 13 illustrated in FIG. 2, when such a lamina 13 is disposed adjacent a duct lamina 20 in the motor assembly 1 of the invention. Thus, a predetermined portion of the inner ends of most of the radial duct slots 22, 22a, etc. are placed in overlapping relationship with respectively adjacent axial coolant apertures 15, etc.

Finally, it should be noted that the coolant duct lamina 20 shown in FIG. 3, and each of the substantially identical associated coolant duct laminae in assembly 1, are each provided with an alignment notch 23 formed in the inner diameter 20a thereof for aligning these laminae for a casting operation in the manner described above with reference to the other laminae of the assembly 1. It should also be understood that various conventional materials may be used to form the respective laminae used in making the laminated rotor assembly of the invention. In this embodiment of the invention a suitable conventional magnetic steel is used to form each of the laminae, as is well-known in the prior art. It should be understood, though, that while conventional magnetic steels are used for each lamination, the different types of laminae may (and in the preferred embodiment do) incorporates different types of steel. For example, the main rotor laminations 13 in this embodiment are made of silicon steel with inorganic coatings, for enhanced performance, while radial duct laminae 20 are made of a non-coated steel to optimize processing.

To complete the laminated rotor assembly 1 of the invention, in the form illustrated in FIG. 1, a preselected plurality of main rotor laminae 13 and duct laminae 20 are arranged in adjacent groups and aligned with each other to place their respective conductor slots and axial coolant passageways in substantial alignment. Such groupings of the main rotor laminae are designated clearly in the enlarged view of FIG. 1A by the numerals 13', and a group of radial duct laminae are designated in FIG. 1A by the numerals 20'. Of course, such groupings are repeated along the longitudinal axis of the assembly 1, as shown in FIG. 1. With the respective sets of main rotor and axial duct laminae thus arranged and with the associated alignment slots 16 and 23 therein positioned to align the respective conductor slots as desired, the stacked laminae assembly is ready to be compressed together to form liquid tight seals between adjacent laminae so that molten metal cannot escape from the conductor slots into the adjacent cooling ducts or vent passageways. The cast conductors and integrally cast annuli 5 and 6 that join the conductors together at the opposite ends are effective, when cooled and hardened, to hold the laminated rotor assembly 1 together. Pursuant to the present invention each of the duct laminae, such as lamina 20, is formed so that one of the coolant ducts, such as duct 22f, is positioned between each adjacent pair of conductor slots, such as the pair of conductor slots 14'–14a' shown in FIG. 3.

Each of the coolant duct slots 22, 22a, etc. are formed to extend radially outward beyond the conductor slots adjacent thereto by at least 0.02 inches. This relative arrangement of the duct slots with the conductor slots makes it possible to easily machine away the peripheral surface 20b of the duct laminae 20 to open the outer ends of the ducts 22, 22a, etc. after conductors are cast in the conductor slots, thereby to enable air to flow through the laminae assembly in the manner explained above. It will be understood that during such a conductor casting operation the ends of the axial passageways 15-15b, etc. in the outermost main rotor laminae 13 will be suitably shielded in a conventional manner to prevent molten casting metal from entering the passageways through the outer laminae.

Those skilled in the art will recognize that various combinations of the two sets of differently configured laminae described above may be assembled to make different forms of cooling passageways and cooling ducts through a rotor assembly pursuant to the invention. However, ratios in a range between about 4 to 1 and 12 to 1, depending on core length, are contemplated as being most useful in practicing the invention and, as shown in FIG. 1 of the drawing, in the embodiment of the invention described in detail here, about a four to one ratio of main rotor laminae 13 to duct laminae 20 is employed so that laminations are arranged in cooperating sets with a group of duct laminae disposed adjacent a group of main rotor laminae at preselected axially spaced intervals. This arrangement enables a large volume of cooling air to be forced through the rotor with a desirably small loss of pressure. Thus, as shown by the arrows in FIG. 1, cooling air is forced by rotation of the shaft 7, and resultant centrifugal force in radial ducts 22, 22a and 22b, etc. (also see FIG. 3), to move axially through the passageways 12 defined by the apertures 15, etc. (see FIG. 2), in the main motor laminae 13, and then to move radially through the ducts 22, 22a, etc. in the duct laminae 20.

It will be recognized that substantially all of the cooling ducts 22, 22a, etc., have a predetermined portion of their length near their inner ends overlapping an associated axial coolant aperture 15, 15b etc. in an adjacent main rotor lamina 13, due to the depth and spacing of the ducts in the duct laminae 20. However, it can also be seen that one or two of the cooling ducts in each duct lamina will not be in overlapping relationship with such axial coolant apertures in the embodiment of the invention described herein. It has been fond that for most commercial applications, the preferred embodiment of the invention disclosed here provides adequate cooling for a rotor and its associated stator.

Other modifications and alternative forms of the invention will be apparent to those skilled in the art from the description of it presented herein; accordingly, it is my intention to encompass within the scope of the following claims the true spirit and limits of the invention.

What I now claim as new and desire to secure by Letters Patent of the United States is:

1. A laminated rotor assembly for a dynamo-electric machine having cast axial conductors and radial ventilating ducts extending between said conductors at axially spaced intervals, characterized
(a) a plurality of substantially flat, annular main rotor laminae each formed with apertures therein to define, respectively, a plurality of conductor slots arcuately spaced adjacent to the periphery of the laminae and a plurality of axial coolant passageways arcuately spaced between the inner ends of said conductor slots and the inner diameter of the laminae,
(b) a plurality of substantially flat, annular radial duct laminae each provided with apertures that define, respectively, a plurality of conductor slots arcuately spaced adjacent to the periphery of the laminae, a plurality of axial coolant passageways arcuately spaced between the inner ends of the conductor slots and the inner diameter of the laminae, and a plurality of radial coolant duct slots each extending from the periphery of the laminae to points between the inner ends of the respective adjacent conductor slots and the maximum outer extent of the respective adjacent axial coolant passageways, said points being radially positioned between said outer extent of said axial coolant passageways and the outer extent of other axial coolant apertures in adjacent main rotor laminae thereby to place the inner ends of a majority of the radial duct slots in overlapping relationship with respective juxtaposed axial coolant passageways in adjacent main rotor laminae,
(c) said pluralities of main rotor laminae and radial duct laminae being aligned with each other to place their respective conductor slots in alignment, and a plurality of cast electrical conductors being positioned, respectively, in each of said conductor slots and joined together at the opposite ends thereof, respectively, by a pair of cast annuli integral with said conductors, said cast conductors and annuli being effective to hold the laminated rotor assembly together.

2. An invention as claimed in claim 1 wherein all of said laminae are compressed together sufficiently to prevent molten metal from flowing between them from the conductor slots into the coolant ducts and passageways when said conductors are cast.

3. An invention as defined in claim 2 in combination with a steel shaft interference-fitted within the inner diameter of all of the annular laminae to support them for rotation on said shaft.

4. A rotor laminae assembly for a dynamo-electric machine having cast axial conductors and radial ventilation ducts extending between said conductors at axially spaced intervals, wherein the improvement consisting of:
(a) a plurality of main rotor laminae having arcuately spaced conductor slots and axial coolant passageways,
(b) a plurality of radial duct laminae each having arcuately spaced conductor slots, axial coolant passageways, and radial coolant duct slots, each of said coolant duct slots being flared outward at both the leading and trailing edges of the outer end thereof,
(c) the inner ends of a majority of said radial coolant ducts being positioned in overlapping relationship with selected portions of the axial coolant passageways through adjacent main rotor laminae, thereby to enable coolant to move from the axial passageways into said radial ducts,
(d) the conductor slots and axial coolant passageways in all of said laminae being in substantial alignment with like slots and passageways in adjacent laminae, and a plurality of cast conductors being disposed, respectively, in each of said conductor slots to hold the assembly together.

* * * * *

UNITED STATES PATENT AND TRADEMARK OFFICE
CERTIFICATE OF CORRECTION

PATENT NO. : 4,365,178

DATED : December 21, 1982

INVENTOR(S) : Henry G. Lenz

It is certified that error appears in the above-identified patent and that said Letters Patent is hereby corrected as shown below:

Column 7, line 63, after "characterized" insert -- by the improvement consisting of: --.

Signed and Sealed this

Fifteenth Day of March 1983

[SEAL]

Attest:

GERALD J. MOSSINGHOFF

Attesting Officer     Commissioner of Patents and Trademarks